Patented Feb. 12, 1946

2,394,582

UNITED STATES PATENT OFFICE 2,394,582

ETHERS OF HYDROXYDIHYDRONORPOLY-CYCLOPENTADIENES

Herman A. Bruson, Philadelphia, Pa., assignor to The Resinous Products & Chemical Company, Philadelphia, Pa., a corporation of Delaware No Drawing. Application February 20, 1943, Serial No. 476,640

19 Claims. (Cl. 260—611)

This invention deals with ethers of hydroxydihydronorpolycyclopentadienes and to a method for their preparation.

I have found that polycyclopentadienes having two double bonds per molecule react in the presence of an acidic condensing agent with organic compounds having at least one alcoholic hydroxyl group to form ethers which, during the reaction, undergo a rearrangement of the terminal endomethylene cycle of the reacting polycyclopentadiene. As a result, there are formed ethers of the corresponding hydroxydihydronorpolycyclopentadiene.

In spite of the fact that in the original polycyclopentadienes there are two apparently equivalent olefinic linkages, only one of these enters into the ether reaction and rearrangement even with large excesses of reagents.

Thus, dicyclopentadiene reacts with ROH, an organic compound having at least one alcoholic hydroxyl group, as follows:

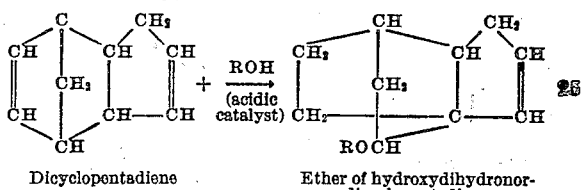

Dicyclopentadiene     Ether of hydroxydihydronor-dicyclopentadiene

The addition-rearrangement product formed from a compound having at least one alcoholic hydroxyl group and dicyclopentadiene in the presence of an acidic condensing agent may be generically represented

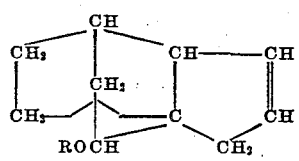

wherein C₃H₄ is a propenylene group which in conjunction with the adjoining carbon atoms forms a cyclopenteno group.

In an analogous manner, tricyclopentadiene reacts only at the terminal endomethylene cycle with saturation of the double bond occurring there and simultaneous rearrangement to give an ether of dihydronortricyclopentadiene. The reaction may be represented in the following way:

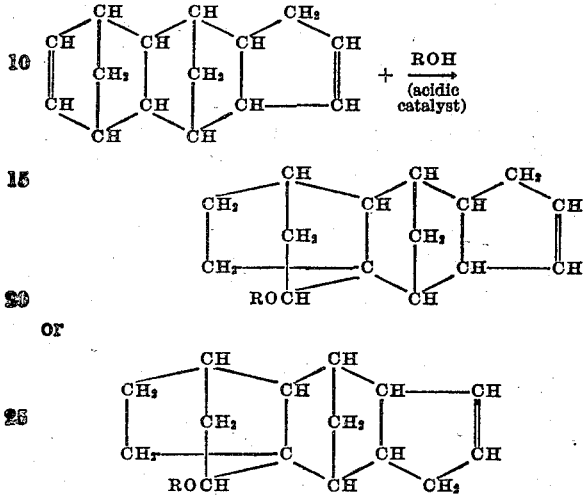

While the products formed may have either or both of the structures shown in the above configurations, that first shown in each example is the more probable.

In this case the addition-rearrangement product may be represented by the formula

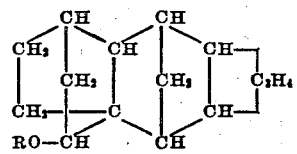

wherein C₃H₄ has the same significance as above.

In similar fashion, there may be depicted the reaction of tetracyclopentadiene or pentacyclopentadiene with organic compounds having one or more alcoholic hydroxyl groups. In the case of a polyhydric hydroxyl-containing compounds, one or more molecules of a polycyclopentadiene may be reacted with each molecule of said compound. Thus, ethylene glycol, a dihydric alcohol, may react with one or two molecules of a polycyclopentadiene, as follows:

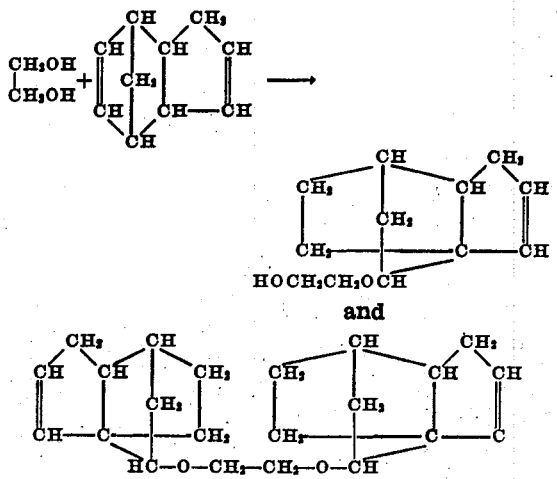

In the case of glycol as a typical dihydric alcohol, the addition-rearrangement product in which both hydroxyl groups react with dicyclopentadiene has the formula:

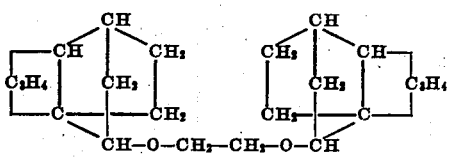

In a similar manner, a molecule of glycerine may take up one, two, or three molecules of a polycyclopentadiene with rearrangement. Pentaerythrite may react with as many as four mols of a polycyclopentadiene. It should be noted, however, that hydroxy compounds having four or more alcoholic hydroxyl groups tend to yield non-crystalline products or resinous products, all of which are ethers, but the full identification of which becomes very difficult, if not impossible.

In place of the dicyclopentadiene and tricyclopentadiene shown in the above illustrations, there may be used tetracyclopentadiene, pentacyclopentadiene, homologues, isomeric forms of the various polycyclopentadienes, and mixtures of such polycyclopentadienes. Mixtures of the higher polycyclopentadienes with dicyclopentadiene are convenient for carrying out the reaction of this invention, since the dicyclo compounds serve as fluxes for the higher polycyclopentadienes and their derivatives. The ether of the hydroxydihydronordicyclopentadiene may be separated from the ethers of the other hydroxydihydronorpolycyclopentadienes.

In practicing this invention, it has been found that a wide variety of organic compounds containing one or more alcoholic hydroxyl groups may be employed. The hydroxyl group is preferably primary or secondary. Compounds containing a tertiary hydroxyl group may also be used, provided, however, that they are not readily dehydrated. Examples of useful reactants having tertiary hydroxyl groups are α-hydroxyisobutyric acid and its esters or acetone cyanohydrin.

The useful alcoholic hydroxyl-containing compounds may be aliphatic, arylaliphatic, cycloaliphatic, including terpenic, hydroaromatic, or heterocyclic, and may be saturated or unsaturated, straight or branched chained, or cyclic. It has also been established that the non-hydroxyl portion of the reacting hydroxyl-containing compound may contain a wide variety of groups or substituents, for example, halogen, cyano, thiocyano, isothiocyano, nitro, keto or acyl, mercapto, acyloxy, aldehydo, alkoxy, aryloxy, ether or thioether linkages in general, carbalkoxy, or carboxy groups.

It should be noted at this point that in the case of compounds having carboxyl groups, excess polycyclopentadiene is necessary, since esterification of the free carboxyl group by addition and simultaneous rearrangement of the polycyclopentadiene group occurs in addition to etherification with the alcoholic hydroxyl group. Ester formation of polycyclopentadienes with acids is described in my co-pending application Serial No. 476,639, filed February 20, 1943. Other reactive groups may similarly cause additional reaction with the polycyclopentadienes having two olefinic linkages with consequent or subsequent etherification.

From the above discussion, it will be evident that under the influence of acidic condensing agents polycyclopentadienes form ethers with a wide variety of alcoholic hydroxyl-containing compounds and that the new reaction is one of wide applicability. Hydroxyl-containing reactants of perhaps greatest interest belong to the general class of unsubstituted alcohols, whether monohydric or polyhydric, which are not dehydrated at 60° C. by sulfuric acid. There are, however, other important types of reactants other than the simple alcohols. Other important groups include hydroxy esters, hydroxy acids, hydroxy ketones, hydroxy lactones, hydroxy aldehydes, ether alcohols, cyanoalcohols, thiocyano alcohols, halohydrins, nitro alcohols, and polymeric hydroxyl-containing compounds, including polyvinyl alcohol, polysaccharides, starches, cellulose, cellulose ethers, and the like.

Typical useful compounds are listed herewith: Methanol, ethanol, propanol, isopropanol, n-butanol, sec.-butanol, iso-butanol, the primary and various secondary isomeric amyl alcohols, n-hexyl alcohol, α-ethyl butanol, 2-hexanol, n-heptanol, n-octanol, capryl alcohol, α-ethyl hexanol, decanol, 5-ethyl-nonanol-2, dodecyl alcohol, tetradecanol, 7-ethyl-2-methyl-undecanol-4, cetyl alcohol, 3,9-diethyl-tridecanol-6, oleyl alcohol, n-octadecanol, allyl alcohol, crotonyl alcohol, cinnamyl alcohol, geraniol, phenyl ethyl alcohol, methoxy ethanol, ethoxy-ethanol, butoxyethanol, phenoxyethanol, ethylene glycol, propylene glycol, butylene glycol-2,3, diethylene glycol, triethylene glycol, polyethylene glycols, di-isopropylene glycol, diethylene glycol monoethyl ether, diethylene glycol monobutyl ether, diethylene glycol monophenyl ether, glycerol, tris(hydroxymethyl)-nitromethane, glycerol monochlorohydrin, glycerol dichlorohydrin, glyceryl α-phenyl ether, glyceryl α, γ-dimethyl ether, trimethylene glycol, triphenylcarbinol, tetramethylene glycol, decamethylene glycol- 1, 10, ethylene chlorohydrin, propylene chlorohydrin, propargyl alcohol, ethylene cyanohydrin, acetone cyanohydrin, 2,4-dihydroxy-2-methyl pentane, propylene cyanohydrin, lactonitrile, mandelonitrile, p-thiocyanophenoxyethanol, 2-nitro-2-methyl-1-propanol, p-tert.-butyl phenoxy ethanol, o-cyclohexyl phenoxy ethanol, 2,4-dichloro-phenoxy ethanol, p-tert.-octyl phenoxy ethanol, p-phenyl phenoxy ethanol, β-naphthoxy ethanol, 2-nitro-phenoxy ethanol, p-acetyl phenoxy ethanol, p-benzoyl phenoxy ethanol, cyclohexanol, p-methyl cyclohexanol, cyclopentanol, o-cyclohexyl cyclohexanol, p-tert.-amyl cyclohexanol, 5-hydroxydihydro-dicyclopentadiene, borneol, fenchol, cholesterol, ethyl glycolate, ethyl lactate, dimethyl tartrate, ethyl citrate, benzyl alcohol, 2-nitro-2-methyl-1,3-propanediol, ethyl-10-hydroxy stearate, tetrahydro furfuryl alcohol, phenyl thioethanol, ceryl alcohol, 2-nitro-2-ethyl-1,3-propanediol, castor oil, hydrogenated castor oil, ethyl malate, sorbitol, dibutyl tartrate, glycerol α, γ-diphenyl ether, mannitol, ethylene glycol monobenzyl ether, ethylene bromohydrin, and many others. The hydroxyl-containing compound used need not be pure. There may be used, for instance, technical alcohol mixtures such as are obtained as by-products from the synthetic production of methanol by the reaction of hydrogen and carbon monoxide and known as "higher alcohols from the methanol synthesis." These comprise branched-chained primary and secondary alcohols having from about 7 to about 18 carbon atoms and in some cases even more. Mixtures of higher alcohols obtained by the catalytic hydrogenation of fatty glycerides or of higher fatty acid esters may likewise be used.

Among the acidic condensing agents or catalysts which serve to promote the addition-rearrangement of alcoholic hydroxyl-containing compounds with polycyclopentadienes are boron trifluoride and its coordination complexes with oxygenated compounds, such as ethers, as, for example, $BF_3.C_3H_7OC_3H_7$, carboxylic acids, as $BF_3.2CH_3COOH$, carboxylic esters, as

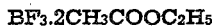

ketones such as $BF_3.CH_3COCH_3$, alcohols, as $BF_3.2C_4H_9OH$, and water, such as $BF_3.(H_2O)_x$, where $x$ is one or two, sulfuric acid, its esters, as ethyl acid sulfate, aromatic sulfonic acids, as toluene sulfonic acid, aliphatic sulfonic acids, as butyl sulfonic acid, acidic salts such as zinc chloride, acidic clays, such as that sold under the trade name of "Tonsil," tetraphosphoric acid, etc. The last few catalysts are useful in special cases but give rather poor yields compared to the yields obtained with the preferred catalysts, which comprise sulfuric acid, boron trifluoride, and their derivatives.

Sulfuric acid is of particular value in promoting reactions involving the lower primary aliphatic alcohols. It is generally of use in the case of other alcohols also which are not readily polymerized or dehydrated by the presence of concentrated sulfuric acid.

The boron fluoride group of catalysts is one of considerable importance. As indicated, it comprises not only boron trifluoride but also its coordination complexes. Of these, the complexes with ethers are of particular utility since they are soluble in the reaction mixtures and produce no troublesome by-products. Typical of these complexes are $BF_3.C_2H_5OC_2H_5$ and

It is interesting and surprising to note that although boron trifluoride promotes polymerization of cyclopentadienes to resins in the absence of an alcohol, it promotes ether formation and rearrangement for the combination of polycyclopentadiene and alcoholic hydroxyl-containing compound.

The quantity of active catalyst employed may be varied over a wide range. Good results have been obtained with as little as 2 per cent. of catalyst based on the weight of polycyclopentadiene up to and exceeding a molar equivalent of the catalyst per mol of polycyclopentadiene used. The catalysts need not be used under anhydrous conditions. In fact, the presence of water in small amounts often increases the rate of reaction.

The addition-rearrangement reaction involving an alcoholic hydroxyl-containing compound and a polycyclopentadiene is readily carried out in the presence of one or more acidic condensing agents. The reaction may be initiated by mixing the components and catalyst at room temperature, at temperatures even around 0° C. in some cases, or at elevated temperatures. While it is generally desirable to control the temperature at the start, the reaction may be carried to completion either by continuing the reaction for a long time or by raising the temperature to accelerate the reactions involved. Temperatures as high as 100° C. to 200° C. may thus be used, the upper temperature being limited by the cracking tendency of the various polycyclopentadienes to revert to simpler forms including cyclopentadiene. The reaction range of about 50° C. to about 125° C. is generally the most useful and is to be preferred. The reaction may be performed under normal, reduced, or increased pressures.

In some cases where the hydroxyl-containing compound contains a negative group, as, for example, in the case of ethylene chlorhydrin, glycerol dichlorohydrin, or 2-nitrobutanol, the reaction is strongly exothermic. Hence, it is desirable and often even necesessary to cool the reacting mixture in order to control the reaction, moderating the violence thereof, and preventing polymerization and possible side reactions. The reaction may also be controlled by the rate of mixing the reactants and by the use of a solvent or diluent, such as a hydrocarbon solvent, including petroleum ethers or petroleum naphthas, or chlorinated solvents, including carbon tetrachloride, ethylene dichloride, chloroform, dichlorobenzene, or ethers, including dioxane, etc.

After the reaction has been carried to a desired point, the acidic condensing agent is removed, as by washing with water or neutralization. The reaction product may then be distilled in many cases or otherwise purified, as by treatment with decolorizing clay or carbon, stripping, extraction, etc.

The following examples illustrate this invention, it being understood that the proportions, temperatures, and time can be varied over a wide range without departing from the spirit of the invention.

*Example 1*

To 240 grams of methanol cooled in an ice bath, 100 grams of 98% sulfuric acid was added dropwise while the reaction mixture was stirred and maintained between 5° and 20° C. Pure dicyclopentadiene in an amount of 528 grams was then added. The resulting mixture was stirred rapidly and boiled under a reflux condenser on a steam bath for three and one-half hours.

The dark solution obtained was cooled and the sulfuric acid destroyed by gradually stirring in 100 grams of powdered calcium hydroxide. The alkaline reaction mixture was then filtered to remove calcium sulfate and excess lime, and the precipitate washed with methanol. The combined filtrate and washings were evaporated on a steam bath under reduced pressure (30–35 mm.) to remove methanol and water. The residual oil, weighing 542 grams, was distilled under reduced pressure (7 mm. of Hg). The product obtained had the following probable structure:

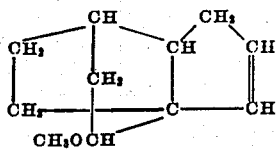

It came over at 80° C./7 mm. as a colorless oil having a pleasant, fruity odor. The yield was 458 grams, or 70% of theory, based on the dicyclopentadiene employed. It possessed the following constants: $n_D^{25}$ 1.4961; $d_4^{25}$ 1.0082; boiling points 94°–95° C./12 mm., 217° C./757 mm.

Example 2

To a solution of 33 grams of 98% sulfuric acid in 200 grams of methanol, 66 grams of tricyclopentadiene was added. The mixture was stirred rapidly and boiled under reflux for one and one-half hours at 70° C. Part of the methanol (130 grams) was then distilled off and the residual product heated for two and one-half hours longer under reflux at 80° C. The reaction product was poured into 500 cc. of hot water and the oil layer separated. The oil was diluted with an equal volume of toluene, washed twice with warm water, then shaken with three parts of calcium hydroxide, and filtered. The filtrate was evaporated to remove the toluene. The residual oil (66 grams) was distilled under reduced pressure. The methoxydihydronortricyclopentadiene distilled over at 130°–142° C./2 mm. as a colorless oil in a yield of 50 grams. Upon redistillation, it boiled at 156°–160° C./9 mm. and possessed the following constants: $N_D^{25}$ 1.5318; $d_4^{25}$ 1.0760.

Example 3

To 200 grams of ethanol cooled to 5° C., 100 grams of 98% sulfuric acid was gradually introduced so that the temperature did not exceed 20° C. To this solution, 132 grams of dicyclopentadiene was added. The mixture was stirred rapidly and boiled under reflux on a steam bath for three hours. The reaction product was poured into water and the oil layer separated. The oil was dissolved in toluene and the solution treated with 5 grams of powdered calcium hydroxide. The filtered solution was then distilled under reduced pressure.

The ethoxydihydronordicyclopentadiene was obtained as a colorless liquid boiling at 104°–105° C./12 mm. and having a pleasant, fruity odor. The yield was 100 grams. It possessed the following constants: $n_D^{25}$ 1.4913; $d_4^{25}$ 0.9930; boiling point, 227° C. at 763 mm.

Example 4

The procedure described in Example 3 was carried out, using 100 grams of 98% sulfuric acid, 200 grams of isopropanol, and 132 grams of dicyclopentadiene. The mixture was stirred rapidly and heated under a reflux condenser at 96°–98° C. for three hours. The product was worked up by washing, neutralizing the washed oil with lime, filtering and distilling the filtrate under reduced pressure.

The isopropoxydihydronordicyclopentadiene distilled over between 70° and 90° C./2 mm. as a faintly yellow oil in a yield of 87 grams. Upon redistillation, it boiled at 107°–110° C./12 mm. and formed a colorless liquid having a pleasant odor. It possessed the following constants: $n_D^{25}$ 1.4897; $d_4^{25}$ 0.9845; boiling point, 234° C. at 763 mm.

Example 5

To 116 grams of allyl alcohol cooled to 0° C., 25 grams of 98% sulfuric acid was gradually added so that the temperature of the resulting mixture did not exceed 5° C. The solution was allowed to come to room temperature and was then mixed with 132 grams of dicyclopentadiene. This mixture was stirred and slowly heated on a steam bath in a flask equipped with a reflux condenser. After the initial exothermal reaction causing temperatures up to 108° C. was over the mixture was stirred for three hours at 95°–100° C.; then poured into water and the oil layer separated. The oil was mixed with an equal volume of toluene, stirred with five parts of powdered lime, and filtered. The filtrate was distilled under reduced pressure. The allyloxydihydronordicyclopentadiene distilled at 92°–95° C./2 mm. as a colorless oil having a pleasant, fruity odor. The yield was 106 parts. Upon redistillation, it boiled at 117°–119° C./12 mm. and possessed the following constants: $n_D^{25}$ 1.5000; $d_4^{25}$ 0.9960.

Example 6

(a) A solution of 200 grams of n-butanol, 100 grams of 98% sulfuric acid, and 132 grams of dicyclopentadiene was prepared as described in Example 1 and heated at 95° C. under a reflux condenser for three hours. The product was washed with water, the oil taken up in toluene, neutralized with sodium carbonate, and finally distilled under reduced pressure.

The product, consisting of 108 grams of n-butyloxydihydronordicyclopentadiene, was a colorless oil boiling at 100°–110° C./2 mm. Upon redistillation, it boiled at 128°–130° C./12 mm. and possessed the following constants: $n_D^{25}$ 1.4841; $d_4^{25}$ 0.9680.

(b) Twenty-five grams of boron trifluoride-diethyl ether complex ($BF_3.C_4H_{10}O$) was dissolved in 111 grams of n-butanol. The solution was mixed with 132 grams of dicyclopentadiene and heated at 95° C. for seven hours and stirred under a reflux condenser. The product was washed twice with water, neutralized with soda, and distilled under reduced pressure. The yield of n-butyloxydihydronordicyclopentadiene was 176 grams, or 85% of theory.

(c) A mixture of 100 grams of sec.-butanol, 25 grams of $BF_3.C_4H_{10}O$, and 132 grams of dicyclopentadiene was treated as described in (b) above.

The yield of sec.-butyloxydihydronordicyclopentadiene boiling at 100°–110° C./3 mm. was 135 grams. Upon redistillation, it boiled at 123°–126° C./12 mm. and formed a colorless liquid possessing the following constants: $n_D^{25}$ 1.4830; $d_4^{25}$ 0.9583. It has a pleasant, melon-like odor.

(b) A mixture of 100 grams of iso-butanol, 25 grams of $BF_3.C_4H_{10}O$, and 132 grams of dicyclopentadiene was heated for three hours at 95° C. under reflux. The product was worked up as in (b) above. The isobutyloxydihydronordicyclopentadiene distilled at 123°–125° C./12 mm. as a colorless liquid of pleasant odor in a yield of 163 grams. It possessed the following constants: $n_D^{25}$ 1.4808; $d_4^{25}$ 0.9545.

Example 7

To 160 grams of ethylene chlorohydrin cooled to 5° C., there was gradually added 25 grams of 98% sulfuric acid while the reaction mixture was stirred and maintained at 15°–18° C. After all of the chlorohydrin had been added, the mixture was allowed to come to room temperature (28° C.) and stirred thereat for one and three-quarter hours. To the solution thus obtained, 132 grams of dicyclopentadiene was added and stirring was continued. A gradual exothermal reaction set in, during which the temperature rose to 75° C. within a half hour. After the reaction had subsided, the mixture was stirred at 90°-95° C. for two and one-quarter hours. The product was washed with water, and the residual oil was taken up in toluene and made alkaline by the addition of excess calcium hydroxide. The product was filtered and the filtrate distilled under reduced pressure.

The chloroethoxydihydronordicyclopentadiene of the probable formula:

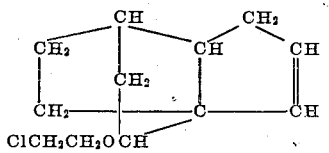

distilled over at 125°-131° C./6 mm. as a pale yellow oil in a yield of 125 grams. Upon redistillation, it came over as a colorless oil boiling at 129°-131° C./7 mm. and possessing the following constants: $n_D^{25}$ 1.5085; $d_4^{25}$ 1.1090.

Example 8

The procedure described in Example 5 was applied to a mixture of 176 grams of isobutyl carbinol, 25 grams of 98% sulfuric acid, and 132 grams of dicyclopentadiene. The product (120 grams), consisting of isoamyloxydihydronordicyclopentadiene, was a colorless oil, boiling at 123°-127° C./6 mm.

Example 9

To a solution of 25 grams of 98% sulfuric acid in 180 grams of glycol monoethyl ether ("Cellosolve") prepared at 15°-20° C., there was added 132 grams of dicyclopentadiene. The mixture was stirred and heated for three hours at 94°-98° C. The resulting product was washed with water and the oil layer diluted with toluene, and treated with 5 grams of powdered lime. The solution was then filtered and distilled under reduced pressure. The β-ethoxyethoxydihydronordicyclopentadiene of the probable formula:

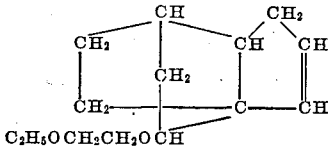

distilled at 109°-115° C./2 mm. as a colorless oil in a yield of 151 grams. Upon redistillation, it boiled at 144°-146° C./12 mm. and possessed the following constants: $n_D^{25}$ 1.4860; $d_4^{25}$ 1.007.

Example 10

A catalyst solution was prepared by dissolving 9.8 grams of 98% sulfuric acid in 3.2 grams of methanol at 0° C. This solution was added to 71 grams of ethylene cyanohydrin. The above mixture was then heated with 132 grams of dicyclopentadiene with rapid stirring at 95° C. for one hour. The product was washed with water, neutralized with lime, filtered and distilled under reduced pressure.

The β-cyanoethoxydihydronordicyclopentadiene distilled over at 140°-144° C./2 mm. as a colorless oil in a yield of 45 grams.

Example 11

To a solution of 281 grams of β-chloroethoxyethanol and 25 grams of 98% sulfuric acid prepared at 5°-10° C., there was added 132 grams of dicyclopentadiene. The mixture was stirred and heated at 95° C. for three and three-quarter hours, then washed, neutralized, filtered and distilled under reduced pressure.

The β-chloroethoxyethoxydihydrodicyclopentadiene distilled at 145°-155° C./3 mm. as a colorless oil. Upon redistillation, it boiled at 142°-146° C./2 mm. and possessed the following constants: $n_D^{25}$ 1.5021; $d_4^{25}$ 1.1088.

Example 12

A mixture of 182 grams of β-phenoxyethanol, 15 grams of 98% sulfuric acid, and 132 grams of dicylclopentadiene was reacted and worked up as described in Example 9.

The phenoxyethoxydihydronordicyclopentadiene distilled at 180°-185° C./2 mm. as a pale yellow oil in a yield of 105 grams. Upon redistillation, it came over at 178°-180° C./2 mm. as a colorless oil having the following constants: $n_D^{25}$ 1.5431; $d_4^{25}$ 1.086.

Example 13

(a) The precedure described in Example 11 was applied to a mixture of 195 grams of n-octanol-1, 25 grams of 98% sulfuric acid, and 132 grams of dicyclopentadiene. The n-octyloxydihydrodicyclopentadiene obtained was a colorless oil boiling at 150°-154° C./2 mm. and possessing the following constants: $n_D^{25}$ 1.4802; $d_4^{25}$ 0.9305.

(b) A mixture of 160 grams of octanol-2, 30 grams of boron trifluoride-diethyl ether complex (BF$_3$.C$_4$H$_{10}$O), and 130 grams of dicyclopentadiene was stirred and heated at 95° C. under a reflux condenser for three hours. The product was washed thoroughly with warm water, followed by a soda wash, then dried and distilled under reduced pressure. The secondary octyloxydihydronordicyclopentadiene distilled at 140°-145° C/2-3 mm. as a colorless liquid in a yield of 165 grams. Upon redistillation, it boiled at 155°-160° C./8 mm. and possessed the following constants: $n_D^{25}$ 1.4782; $d_4^{25}$ 0.9277.

Example 14

A catalyst solution of methyl sulfuric acid ester was prepared by dissolving 5 grams of methanol in 16 grams of 98% sulfuric acid at 10°-15° C. This solution was mixed with 153 grams of tetrahydrofurfuryl alcohol, and to the mixture 132 grams of dicyclopentadiene was added. The mixture was stirred rapidly and heated at 95° C. for two and one-half hours. The product was washed thoroughly with water, and the acidity was completely destroyed by means of lime. The filtered product was distilled under reduced pressure. The tetrahydrofurfuryloxydihydronordicyclopentadiene of the probable formula:

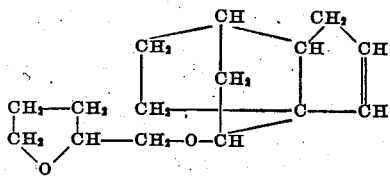

distilled over at 140°-145° C./2-3 mm. as a colorless oil in a yield of 101 grams. Upon redistillation, it boiled at 139°-141° C./2 mm. and possessed the following constants: $n_D^{25}$ 1.5042; $d_4^{25}$ 1.057.

*Example 15*

To a rapidly stirred mixture of 129 grams of 1,3-dichloro-2-propanol and 132 grams of dicyclopentadiene heated to 60° C., there was added dropwise, during the course of twenty minutes, 25 grams of boron trifluoride-diethyl ether complex, care being taken to moderate the exothermal reaction by means of a cooling bath so that the reaction temperature did not exceed 65° C. After all of the catalyst had been added and the reaction had ceased, the mixture was stirred for two hours longer at 55°–60° C., then washed with hot water, followed by a wash with soda solution and then with water. The dark viscous oil was dried in vacuo on a steam bath. The yield was 205 grams. Upon distillation under reduced pressure, the dichloropropoxydihydronordicyclopentadiene distilled at 150°–160° C./3 mm. as a colorless oil. Upon redistillation, it boiled at 140°–142° C./2 mm. and possessed the following constants: $n_D^{25}$ 1.5187; $d_4^{25}$ 1.191.

*Example 16*

A mixture of 30 grams of boron trifluoride-diethyl ether complex ($BF_3 \cdot C_4H_{10}O$), 186 grams of technical grade n-dodecanol ("Lorol"), and 132 grams of dicyclopentadiene was stirred and heated on a steam bath for three and three-quarter hours at 95° to 100° C. The product was washed with hot water, then with soda solution, dried, and distilled under reduced pressure. The product distilled at 180°–200° C./2 mm. as a faintly yellow oil in a yield of 200 grams. Upon redistillation, the n-dodecyloxydihydronordicyclopentadiene (170 grams) came over at 184°–185° C./2 mm. as a colorless oil possessing the following constants: $n_D^{25}$ 1.4815; $d_4^{25}$ 0.9166.

*Example 17*

To 122 grams of phenylethyl alcohol there was added 20 grams of 98% sulfuric acid at such a rate that the temperature did not exceed 15° C. To this was added 132 grams of dicyclopentadiene, and the mixture was stirred and heated at 96°–98° C. for two and one-half hours. The product was then washed with hot water, neutralized with alkali, washed, dried, and distilled under reduced pressure. The phenylethyloxydihydronordicyclopentadiene distilled at 166°–180° C./2 mm. as a pale yellow oil in a yield of 144 grams. Upon redistillation, it came over at 160° C./2 mm. as a colorless oil having the following constants: $n_D^{25}$ 1.5387; $d_4^{25}$ 1.041.

*Example 18*

A mixture of 132 grams of dicyclopentadiene and 270 grams of n-octadecanol (technical product known as "Stenol") was heated to 60° C., and to the clear melt 30 grams of $BF_3 \cdot C_2H_5$—O—$C_2H_5$ was added. The mixture was stirred for four hours at 95° C. It was washed several times with hot water, then with hot soda solution, and finally with boiling water. An oil was separated which was dried in vacuo at 100° C. and cooled, whereupon the product (400 grams) solidified. Upon distillation under reduced pressure, this yielded as the main fraction a cut boiling at 235°–245° C./2 mm. which solidified in the cold to a colorless, low melting, waxy solid. Analysis indicated the product to be mainly n-octadecyloxydihydronordicyclopentadiene together with a lesser amount of n-hexadecyloxydihydronordicyclopentadiene.

*Example 19*

A mixture of 119 grams of 2-nitro-2-methylpropanol-1 and 132 grams of dicyclopentadiene was heated to 60° C. and stirred until a clear, homogeneous melt was obtained. To this melt there was added dropwise 30 grams of boron fluoride-diethyl ether complex during a period of forty-five minutes while the mixture was stirred and the reaction temperature maintained at 60°–64° C. by appropriate cooling to control the strong exothermal reaction which occurred. When the exothermal reaction had ceased, the mixture was heated at 70°–80° C. for one hour and was then poured into water. A dark oil separated and was washed with hot water several times to remove the boron fluoride and any unchanged nitromethyl propanol. The residual oil was dried in vacuo at 90° C. The yield was 192 grams. Upon distillation in vacuo, the product, having the probable formula:

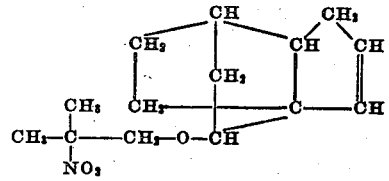

distilled at 155°–160° C./2 mm. as a colorless oil. Upon redistillation, it boiled at 152°–155° C./2 mm. and possessed the following constants: $n_D^{25}$ 1.4980; $d_4^{25}$ 1.093.

*Example 20*

Dicyclopentadiene (132 grams) was added to a solution of 25 grams of boron fluoride-diethyl ether complex in 120 grams of glyceryl-1,3-dimethyl ether. The mixture was stirred and heated at 93°–95° C. for three hours. The solution was then washed with warm water, followed by a wash with dilute soda solution, and finally with water. The product was dried under a reduced pressure of 30 mm. on a steam bath. The yield was 210 grams of an oil residue. Upon redistillation of this oil in vacuo, a product was obtained boiling at 130°–140° C./2 mm., consisting of a colorless oil, 1,3-dimethoxy-propoxy-2-dihydro-nordicyclopentadiene. Upon redistillation, it boiled at 162° C./12 mm. and possessed the following constants: $n_D^{25}$ 1.4851; $d_4^{25}$ 1.036.

*Example 21*

Dicyclopentadiene (132 grams) was added to a mixture of 118 grams of glycol monobutyl ether ("Butyl Cellosolve") and 25 grams of boron fluoride-diethyl ether. The mixture was stirred and heated on a steam bath at 95° C. for three hours under a reflux condenser. The dark purple liquid was washed with warm water, then with soda solution, washed again, and dried under reduced pressure of 30 mm. on a steam bath. The residual oil, weighing 220 grams, was distilled under reduced pressure. The butoxy-ethoxydihydronordicyclopentadiene distilled at 135°–140° C./3 mm. as a colorless liquid. The yield was 177 grams. Upon redistillation, it boiled at 169°–172° C./12 mm. and possessed the following constants: $n_D^{25}$ 1.4806; $d_4^{25}$ 0.9806.

*Example 22*

To a mixture of 108 grams of benzyl alcohol and 132 grams of dicyclopentadiene heated to 60° C. and stirred rapidly under a reflux condenser, there was added gradually 25 grams of boron fluoride-diethyl ether. The mixture was held at 60°-65° C. for three hours. It was then washed with hot water several times, and finally washed with soda solution followed by a water wash. The oil was dried at 30 mm. pressure on a steam bath at 90°-95° C. The residual oil weighing 232 grams, was then distilled under reduced pressure.

The benzyloxydihydronordicyclopentadiene distilled at 150°-158° C./2 mm. as a colorless oil in a yield of 155 grams. Upon redistillation, it boiled at 160°-162° C./4 mm. and possessed the following constants: $n_D^{25}$ 1.5461; $d_4^{25}$ 1.058.

Example 23

(a) A mixture of 62 grams of ethylene glycol (1 mol), 132 grams of dicyclopentadiene (1 mol), and 25 grams of $BF_3.C_2H_5$—O—$C_2H_5$ was stirred and gradually heated to 95° C. under a reflux condenser. After about fifteen minutes, an exothermal reaction set in which raised the temperature to 125° C. The mixture was then heated at 95° C. for three hours after the exothermal reaction had subsided. It was then washed with hot water, neutralized with soda, dried, and distilled under reduced pressure. The β-hydroxyethoxydihydronordicyclopentadiene distilled at 125°-140° C./2 mm. as a colorless oil in a yield of 99 grams. Upon redistillation, it boiled at 152°-154° C./12 mm. and possessed the following constants: $n_D^{25}$ 1.5105; $d_4^{25}$ 1.085.

A higher boiling fraction (boiling point, 210°-215° C./2 mm.) was also obtained as a pale yellow oil (43 grams). Analysis showed it to be the di-ether. Upon redistillation, it boiled at 208°-210° C./2 mm. and possessed the following constants: $n_D^{25}$ 1.5263; $d_4^{25}$ 1.077; iodine No. 161 (theory 156).

(b) A mixture of 62 grams of ethylene glycol (1 mol) and 10 grams of 98% sulfuric acid was made up at 15°-20° C. To this was added 264 grams of dicyclopentadiene (2 mols), and the mixture was stirred at 95°-98° C. for three hours. The product was worked up as in (a) above, and yielded 39 grams of β-hydroxyethoxydihydronordicyclopentadiene and 111 grams of di-(dicyclopentenyl) ether of ethylene glycol boiling at 208°-210°C./2 mm.

Example 24

A mixture of 152 grams of benzyloxyethanol ("Benzyl Cellosolve") and 132 grams of dicyclopentadiene was heated to 55° C. and stirred while 30 grams of boron fluoride-diethyl ether complex ($BF_3.C_4H_{10}O$) was added dropwise during ten minutes. The mixture was stirred thereafter for two hours at 60°-70° C. and finally for two hours at 95° C. It was then washed, neutralized, and dried in vacuo at 90° C. The yield was 277 grams of crude product. Upon distillation under reduced pressure, the benzyloxyethoxydihydronordicyclopentadiene distilled at 188°-195° C./2 mm. as a colorless oil in a yield of 112 grams. Upon redistillation, it boiled at 184°-188° C./2 mm. and possessed the following constants: $n_D^{25}$ 1.5549; $d_4^{25}$ 1.067.

Example 25

To a stirred solution of 132 grams of dicyclopentadiene and 100 grams of cyclohexanol at 60° C., there was added gradually 25 grams of $BF_3$.diethyl ether complex. The mixture was stirred for one hour at 60° C. The temperature was then raised to 75° C. and the mixture stirred thereat for one and three-quarter hours. Finally, the temperature was raised to 95°-97° C. A slight exothermal reaction set in (temperature, 101°), which soon subsided. The reaction mixture was then stirred for two hours at 95°-97° C. The product was separated, washed, neutralized, and dried in vacuo at 90° C. The yield was 200 grams of residual oil. Upon distillation of this oil in vacuo, the cyclohexyloxydihydronordicyclopentadiene distilled at 130°-140° C./2 mm. as a colorless oil. Upon redistillation, it boiled at 163°-166° C./12 mm. and possessed the following constants: $n_D^{25}$ 1.5083; $d_4^{25}$ 1.009.

Example 26

A mixture of 106 grams of diethylene glycol and 132 grams of dicyclopentadiene was stirred at 60° C. and 25 grams of boron trifluoride-diethyl ether complex was run in dropwise. The mixture was stirred for one hour at 60°-70° C., then for two and one-half hours at 70°-80° C., and finally for two hours at 95° C. The product was then washed with hot water, followed by a soda wash and a final water wash, and was distilled under reduced pressure. The fraction boiling at 150°-160° C./3 mm. was a colorless oil, weighing 102 grams and having the probable formula:

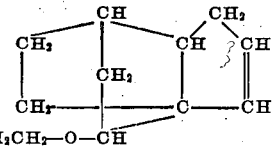

Upon redistillation, it boiled at 154°-158° C./3 mm. and possessed the following constants: $n_D^{25}$ 1.5029; $d_4^{25}$ 1.086.

A higher boiling fraction, distilling at 235°-245° C./2 mm., was also obtained as a pale yellow oil in a yield of 87 grams. It consisted essentially of the di-dicyclopentenyl ether of diethylene glycol, having the formula $C_{10}H_{13}$—O—$CH_2CH_2$—O—$CH_2CH_2$—O—$C_{10}H_{13}$ Upon redistillation, it boiled at 232°-236° C./2 mm. and possessed the following constants: $n_D^{25}$ 1.5190; $d_4^{25}$ 1.081.

Example 27

To a mixture of 102 grams of 2-ethyl butanol and 132 grams of dicyclopentadiene was gradually added, with stirring, 20 grams of boron fluoride-diethyl ether complex at 50° C. The mixture was then stirred for thirty minutes at 60°-75° and then heated to 95° C. An exothermal reaction set in, during which the temperature rose to 110° C. After the evolution of heat had subsided, the mixture was stirred for one hour longer at 95° C., then washed, neutralized, dried, and distilled under reduced pressure. The product, 2-ethyl-butyldihydronordicyclopentadiene, distilled at 123°-126° C./2 mm. as a colorless liquid in a yield of 145 grams. Upon redistillation, it boiled at 152° C./12 mm. and possessed the following constants: $n_D^{25}$ 1.4830; $d_4^{25}$ 0.9476.

Example 28

A mixture of 99 grams of tricyclopentadiene and 47 grams of 2-chloroallyl alcohol was stirred at 60° C. while 15 grams of boron fluoride-diethyl ether complex was added dropwise during the course of ten minutes. The mixture was stirred thereafter at 65° C. for four hours. It was washed with hot water, and soda solution, dried and distilled in vacuo. The desired 2-chloro-allyloxydihydronortricyclopentadiene of the probable formula:

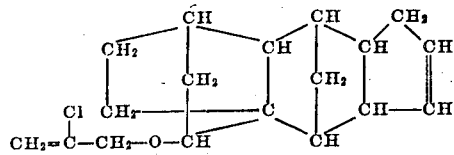

distilled at 189°–192° C./3 mm. as a thick pale yellow oil in a yield of 59 grams of pure product, having the following constants: $n_D^{25}$ 1.5409; $d_4^{25}$ 1.145.

*Example 29*

To a mixture of 92 grams of glycerol and 132 grams of dicyclopentadiene stirred at 55°–60° C., there was added dropwise 25 grams of boron fluoride-diethyl ether complex. The temperature was then raised to 70° C. and held at 70°–80° C. for three and one-half hours. The product was washed with hot water, soda solution, water again and distilled in vacuo. The mono-ether of glycerol of the probable structure:

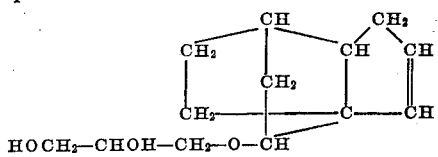

distilled over at 175°–185° C./2 mm. as a colorless, very viscous oil in a yield of 83 grams. Upon redistillation, it boiled at 175°–180° C./2 mm. and possessed the following constants: $n_D^{25}$ 1.5186; $d_4^{25}$ 1.136.

There was also obtained a liquid fraction amounting to 40 grams, boiling at 235°–240° C./2 mm., the analysis of which corresponds to a bisdihydronordicyclopentadienyl ether of glycerol.

*Example 30*

A mixture of 51 grams of n-hexyl alcohol, 99 grams of tricyclopentadiene, and 15 grams of boron fluoride-diethyl ether complex was stirred at 95° C. for three hours. The product was washed with hot water, neutralized with soda, dried, and distilled in vacuo.

The n-hexyloxydihydronortricyclopentadiene distilled at 180°–184° C./2 mm. as a pale yellow oil. The yield was 45 grams. It possessed the following constants: $n_D^{25}$ 1.5139; $d_4^{25}$ 1.011.

*Example 31*

A mixture of 81 grams of ethylene chlorohydrin, 198 grams of tricyclopentadiene, and 25 grams of BF₃.C₂H₅—O—C₂H₅ was stirred at 60°–65° for one and one-quarter hours, then at 75° for three hours. The product was washed, neutralized with soda, and distilled in vacuo.

The β-chloroethoxydihydronortricyclopentadiene distilled at 180°–185° C./3 mm. as a pale yellow, viscous oil in a yield of 85 grams.

*Example 32*

A mixture of 119 grams of 2-nitro-1-butanol and 132 grams of dicyclopentadiene was heated to 60° C. and stirred while 20 grams of

BF₃.C₂H₅—O—C₂H₅ was added dropwise during twenty minutes. The exothermal reaction was controlled by cooling so that the temperature was held at 55°–60° C. throughout the addition period. The mixture was then held at 60° C. for five hours longer. It was washed with hot water thoroughly and dried at 90° C. under reduced pressure. The residual oil, weighing 208 grams, was then distilled in vacuo.

The 2-nitrobutoxydihydronordicyclopentadiene distilled at 155°–160° C./2 mm. as a colorless oil in a yield of 127 grams. Upon redistillation, it boiled at 160° C./3 mm. and possessed the following constants: $n_D^{25}$ 1.4966; $d_4^{25}$ 1.093.

*Example 33*

A mixture of 136 grams of powdered pentaerythrite and 132 grams of dicyclopentadiene was rapidly stirred at 50° C. while 25 grams of boron fluoride-diethyl ether complex was added dropwise. The temperature gradually rose to 60° C. and was held at 60°–70° C. for one and one-half hours. The almost solid resulting mass was stirred with boiling water to remove catalyst and unreacted pentaerythrite. This was repeated several times. The product was then dissolved in toluene, filtered, and the filtrate evaporated under reduced pressure. The residual pentaerythrite ether of nordicyclopentadiene was an amber-colored hard resin having a hydroxyl number of 103. It was produced in a yield of 160 grams. It was soluble in linseed oil or in petroleum naphtha.

*Example 34*

A mixture of 132 grams of ethyl-α-hydroxy-isobutyrate and 132 grams of dicyclopentadiene was stirred at 50° C., and 25 grams of

BF₃.C₂H₅—O—C₂H₅ was added dropwise. The mixture was then stirred at 50°–60° C. for three and one-half hours. It was cooled, mixed with an equal volume of toluene, and washed thoroughly with water, soda solution, and finally with water. The toluene was evaporated off under reduced pressure on a steam bath. The residual oil was distilled in vacuo. The product having the probable formula:

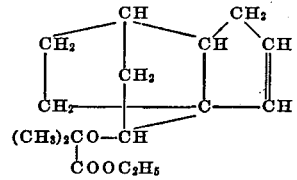

distilled over at 131°–134° C./3 mm. as a colorless oil and possessed the following constants: $n_D^{25}$ 1.4799; $d_4^{25}$ 1.033; saponification number, 214 (theory 212.5).

*Example 35*

A mixture consisting of 240 grams of methoxy ethoxyethanol (CH₃—O—CH₂CH₂—O—CH₂CH₂OH)

132 grams of dicyclopentadiene, and 15 grams of 98% sulfuric acid was stirred at 95° C. for three and one-quarter hours. The product was washed with water, taken up in toluene, washed with soda solution and then with water, dried, and distilled in vacuo. The methoxyethoxyethoxydihydronordicyclopentadiene distilled at 146°–152° C./2 mm. as a colorless oil possessing the following constants: $n_D^{25}$ 1.4905; $d_4^{25}$ 1.047.

*Example 36*

To a stirred mixture of 134 grams of glycerol monoacetate and 132 grams of dicyclopentadiene at 55° C., there was added dropwise 25 grams of boron trifluoride-diethyl ether complex. The mixture was then heated at 80° C. for three and one-half hours. It was cooled, washed with cold water, then with sodium carbonate solution, and again with cold water. The product was dried in vacuo on a steam bath and the residual oil, weighing 210 grams, distilled in vacuo. The fraction boiling at 170°–190° C./2 mm. was a pale yellow oil (69 grams) which, upon redistillation, boiled at 180°–184° C./4 mm. It was the monoether. The fraction (73 grams) boiling at 245°–250° C./4 mm. consisted of the di-ether

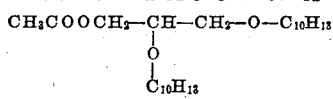

where $C_{10}H_{13}$ is the dihydronordicyclopentadiene group.

Example 37

To a stirred mixture of 118 grams of ethyl lactate and 132 grams of dicyclopentadiene at 50° C., there was gradually added 25 grams of boron fluoride-diethyl ether complex. The mixture was stirred for four and one-quarter hours thereafter at 60° C. It was then cooled, washed twice with cold water, taken up in toluene, washed with cold soda solution, then again with water, and the toluene evaporated in vacuum. The residual oil (203 grams) was distilled at 125°–142° C./2 mm. as a colorless oil. The yield was 106 grams. Upon redistillation, the cut boiling at 125°–128° C./2 mm. possessed the following constants: $n_D^{25}$ 1.4823; $d_4^{25}$ 1.050; saponification number, 219 (theory 224). Analysis indicated it to have the formula:

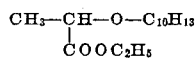

Example 38

A mixture of 76 grams of glycolic acid (1 mol) and 262 grams of dicyclopentadiene (2 mols) was stirred at 50° C. while 30 grams of boron fluoride-diethyl ether complex was added dropwise during the course of five minutes. The strongly exothermal reaction was cooled externally with ice, the reaction temperature finally reaching 90° C. The mixture was stirred thereafter at 80° C. for three hours. It was cooled, mixed with an equal volume of toluene, and washed several times with water followed by soda solution, and then with water. The toluene layer was separated and evaporated to dryness in vacuo on a steam bath. The residual oil, weighing 290 grams, was distilled in vacuo.

At 210°–230° C./2 mm., a pale yellow oil (62 grams) distilled which consisted of a mixture of the hydroxydihydronordicyclopentadiene ester of glycolic acid, $HOCH_2COOC_{10}H_{13}$, and the ether thereof, namely, $C_{10}H_{13}-O-CH_2COOC_{10}H_{13}$. At 230° C./2 mm., a pale yellow oil (48 grams) distilled which was essentially the pure ether of the glycolate, $C_{10}H_{13}-O-CH_2COOC_{10}H_{13}$.

Example 39

A mixture of 66 grams of dicyclopentadiene, 15 grams of $BF_3$-diethyl ether, and 107 grams of 7-ethyl-2-methylundecanol-4 ("Tetradecanol"), was heated and stirred at 90° C. for five hours. The product was washed, neutralized, dried, and distilled in vacuo as described above. The tetradecyloxydihydronordicyclopentadiene boiled at 175°–185° C./2 mm. Upon redistillation, it came over as a colorless oil, having a boiling point of 176°–179° C./2 mm. and possessing the following constants: $n_D^{25}$ 1.4915; $d_4^{25}$ 0.9388.

Example 40

A mixture of 132 grams of dicyclopentadiene and 150 grams of hydroxydihydronordicyclopentadiene—

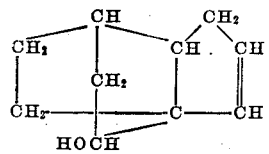

was heated to 70° C. and stirred while 15 grams of boron trifluoridediethyl ether complex was added dropwise. The mixture was then stirred for six hours at 70° C. It was worked up by washing, neutralizing, and distilling in vacuo. The resulting di-(dihydronordicyclopentadiene)-ether distilled at 180°–185° C./2 mm. as a faintly yellow, somewhat viscous, oil in a yield of 108 grams. Upon redistillation, it came over as a colorless liquid boiling at 185°–188° C./3 mm. and having the following constants: $n_D^{25}$ 1.5372; $d_4^{25}$ 1.077; iodine number, 185 (theory, 180). The hydroxydihydronordicyclopentadiene used is a colorless liquid boiling at 240° C., obtainable by reacting dicyclopentadiene with aqueous sulfuric acid as described in co-pending application Serial No. 476,645, filed February 20, 1943.

Example 41

To a stirred mixture of 53 grams of dicyclopentadiene and 56 grams of β-thiocyanoethoxyethanol at 60° C., there was added 10 grams of boron trifluoride-diethyl ether complex. The mixture was stirred at 68°–70° C. for five and one-half hours, then washed, neutralized with soda, washed again, and distilled in vacuo. The β-thiocyanoethoxyethoxydihydronordicyclopentadiene distilled at 200°–210° C./3 mm. as a pale yellow oil. Upon redistillation, it boiled at 195°–198° C./3 mm. and possessed the following constants: $n_D^{25}$ 1.5251; $d_4^{25}$ 0.9415. It is useful as an insecticide against flies, mosquitoes, and other soft-bodied insects.

Example 42

A mixture of 164 grams of ethyl-12-hydroxystearate (from hydrogenation of ethyl ricinoleate) and 66 grams of dicyclopentadiene was heated with 20 grams of $BF_3$-diethyl ether complex for five and one-half hours at 80°–85° C. After the reaction mixture was washed, neutralized, and dried as above, the product was distilled in vacuo. The carbethoxyoctadecyloxydihydronordicyclopentadiene boiled at 255°–260° C./2 mm. in a yield of 56 grams. It was a pale yellow oil having a saponification number of 124 (theory, 122).

Example 43

(a) A mixture of 85 grams of p-tert.-amylcyclohexanol, 66 grams of dicyclopentadiene, and 15 grams of $BF_3$-diethyl ether complex was reacted at 90° C. for five and one-half hours. After being worked up as described above, the p-tert.-amylcyclohexyloxydihydronordicyclopentadiene was obtained as a colorless oil boiling at 178°–180° C./2 mm.

(b) In the same manner, 91 grams of o-cyclohexylcyclohexanol in place of the tert.-amylcyclohexanol above yielded o-cyclohexylcyclohexyloxydihydronordicyclopentadiene as a colorless oil boiling at 186°–190° C./3 mm. and possessing the following constants: $n_D^{25}$ 1.5313; $d_4^{25}$ 1.0435.

Example 44

To a stirred solution of 104 grams of ethyl glycolate and 132 grams of dicyclopentadiene at 50° C., there was added dropwise 25 grams of boron trifluoride-diethyl ether complex. The mixture was stirred for four and one-half hours at 60° C., then cooled, washed with cold water, soda solution, dried, and distilled in vacuo. The dicyclopentenyl ether of ethyl glycolate of the probable formula—

$$C_2H_5OOC-CH_2-O-C_{10}H_{13}$$

distilled at 150°–160° C./5 mm. as a pale yellow oil in a yield of 80 grams. Upon redistillation, it came over as a colorless oil boiling at 134°–136° C./1.5 mm. and having the following constants: $n_D{}^{25}$ 1.4920; $d_4{}^{25}$ 1.0871; saponification number, 240 (theory, 237); iodine number, 111 (theory, 108).

Example 45

To a stirred solution of 85 grams of acetone cyanohydrin and 132 grams of dicyclopentadiene at 60° C., there was added gradually 25 grams of boron trifluoride-diethyl ether complex. The mixture was stirred at 70° C. for six and one-half hours. It was then washed with water, neutralized, dried, and distilled in vacuo. The cyanoisopropoxydihydronordicyclopentadiene distilled at 130°–135° C./3 mm. Upon redistillation, it came over at 110°–112° C./1–2 mm. as a colorless liquid having the following properties: $n_D{}^{25}$ 1.4870; iodine number of 118 (theory, 117), and containing 6.3% of nitrogen (theory 6.4% N).

Example 46

To a stirred suspension of 55 grams of powdered mannitol and 118 grams of dicyclopentadiene heated to 60° C., there was gradually added 15 grams of boron trifluoride-diethyl ether complex. The exothermal reaction was controlled by cooling so that the temperature did not exceed 75° C. The mixture was stirred for one hour longer at 60° C. The solidified mass was then washed several times with hot water, and the dark resinous product dissolved in warm toluene. The toluene solution was washed with water, then with soda, and finally evaporated in vacuo at 100° C. The residue was a brittle dark resin, weighing 130 grams, which was soluble in petroleum naphtha.

Example 47

Five hundred grams of dicyclopentadiene was heated in a closed autoclave at 160°–170° C. for seven hours. The white pasty mass obtained, consisting of tricyclopentadiene, tetracyclopentadiene, and pentacyclopentadiene together with some unchanged dicyclopentadiene, was mixed at 65° C. with 200 grams of ethanol and 50 grams of BF₃-diethyl ether complex. The mixture was stirred and heated for 18 hours at 90° C. The product was washed with hot water, taken up in toluene, washed several times with hot water and soda solution, and filtered. The filtrate was evaporated to dryness. The residual oil (350 grams) was fractionated in vacuo.

The ethyloxydihydronordicyclopentadiene boiled at 104°–105° C./12 mm. in a yield of 60 grams.

The ethyloxydihydronortricyclopentadiene distilled at 135°–138° C./1.5 mm. in a yield of 100 grams. It was a colorless oil.

The ethyloxydihydronortetracyclopentadiene distilled at 190°–195° C./2 mm. as a colorless viscous oil in a yield of 97 grams.

The ethyloxydihydronorpentacyclopentadiene remained behind in the still as a solid which could not be distilled in vacuo without decomposition.

Example 48

To a stirred mixture of 186 grams of castor oil (0.2 mol) and 79.2 grams of dicyclopentadiene (0.6 mol), there was added 10 grams of boron trifluoride-diethyl ether complex. The mixture was stirred at 90° C. for five hours. The dark viscous mass was then washed twice with water, then with dilute soda solution, and finally with water. It was then heated in vacuo at about 2 mm. pressure at 200° C. to remove moisture and traces of unchanged dicyclopentadiene. The residual product weighed 261 grams and consisted of a viscous dark oil which, in contrast to castor oil, was readily soluble in kerosene or in mineral oil and can be used as a hydraulic fluid component for brakes and recoil systems. Chemically, the product is chiefly the tri-dihydronordicyclopentadienyl ether of ricinoleic triglyceride.

Example 49

A mixture of 52 grams of menthol, 44 grams of dicyclopentadiene, 49 grams of ethylene dichloride, and 15 grams of $(C_2H_5)_2O.BF_3$ was stirred for five hours at 48°–50° C. and then for two hours at 90° C. The reaction mixture was washed with water and with a solution of soda ash. It was then dried in vacuo and the solvent distilled off. The residual oil (92 grams) was then distilled under reduced pressure, and the fraction passing over at 167°–170° C. at 3 mm. was collected as a water-white oil. This was identified as menthoxydihydronordicyclopentadiene, having the following constants: $d_4{}^{25}$ 0.9787; $n_D{}^{25}$ 1.5028.

Example 50

By the same procedure as that used above, an equivalent amount of borneol was reacted in place of the menthol. The resulting bornyl ether boiled at 166°–170° C./3 mm. and had the following constants: $d_4{}^{25}$ 1.0079; $n_D{}^{25}$ 1.5100.

In the presence of acidic condensing agents, polycyclopentadienes of the formula:

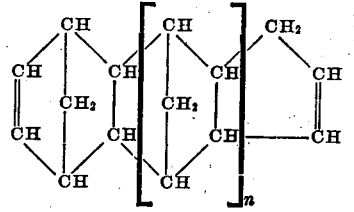

wherein $n$ is zero or a small whole number, such 1, 2, or 3, the corresponding polycyclopentadienes having, therefore, one to four endomethylene cycles, react with organic compounds having at least one alcoholic hydroxyl group to yield ethers of hydroxydihydronorpolycyclopentadienes. The reaction involves both an addition reaction and a rearrangement of the terminal endomethylene group of the polycyclopentadiene.

The probable formula of the simplest products may be represented by the following configuration:

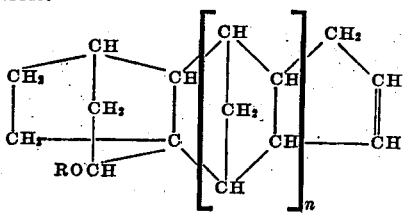

wherein R is the organic residue of an alcoholic hydroxyl-containing compound and $n$ a number from zero to a small integer.

By the process here disclosed, new ethers are obtained in an inexpensive manner. These possess properties fitting them for a great variety of industrial applications. Many of the new ethers are useful as solvents for resins and waxes. High boiling ethers are useful as plasticizers for natural and synthetic resins and elastomers, including synthetic rubbers, polyvinyl chloride, polyvinyl esters, polystyrene, polyacrylic esters, polymethacrylic esters, co-polymers of such materials, rubber hydrochloride, chlorinated rubber, nitrocellulose, cellulose acetate, ethyl cellulose, cellulose acetate-butyrate, etc. Derivatives containing such groups as halogen, nitro, cyano, thiocyano, etc., possess insecticidal action to a marked degree. Some of the lower ethers have pleasant, flowery odors which recommend them for such uses as scenting soaps, cosmetics, and the like.

Since the ethers possess a double bond, they may be reacted with hydrogen, halogen, thiocyanogen and similar agents to yield new compounds which are useful as solvents, hydraulic fluids, oil additives, insecticides, etc. The ethers also react with sulfuric acid to give water-soluble products useful as wetting and penetrating agents, emulsifiers, and detergents.

Although in the above examples practically pure polycyclopentadienes have been used, the process shown may also be applied to mixtures of hydrocarbons which contain 5% or more of the polycyclopentadienes having two double bonds per molecule, such as are obtained in the thermal cracking of petroleum or in the manufacture of water gas. The reaction of the polycyclopentadienes provides a new means for separating the components of mixtures of unsaturated hydrocarbons and gives new utility to such products.

I claim:

1. A method for preparing ethers of hydroxy-dihydronorpolycyclopentadiene having an ether group on one terminal cycle and an olefinic linkage in the opposite terminal cycle which comprises reacting by addition and rearrangement in the presence of an acidic condensing agent a polycyclopentadiene having two double bonds and having one to four endomethylene cycles per molecule and an organic compound which has at least one alcoholic hydroxyl group at a temperature above about 0° C. and below the depolymerization temperature of the polycyclopentadiene.

2. A method for preparing ethers of hydroxy-dihydronorpolycyclopentadiene having an ether group on one terminal cycle and an olefinic linkage in the opposite terminal cycle which comprises reacting by addition and rearrangement in the presence of sulfuric acid a polycyclopentadiene having two double bonds and having one to four endomethylene cycles per molecule and an organic compound which has at least one alcoholic hydroxyl group at a temperature above about 0° C. and below the depolymerization temperature of the polycyclopentadiene.

3. A method for preparing ethers of hydroxy-dihydronorpolycyclopentadiene having an ether group on one terminal cycle and an olefinic linkage in the opposite terminal cycle which comprises reacting by addition and rearrangement in the presence of a boron trifluoride catalyst a polycyclopentadiene having two double bonds and having one to four endomethylene cycles per molecule and an organic compound which has at least one alcoholic hydroxyl group at a temperature above about 0° C. and below the depolymerization temperature of the polycyclopentadiene.

4. A method for preparing ethers of hydroxy-dihydronorpolycyclopentadiene having an ether group on one terminal cycle and an olefinic linkage in the opposite terminal cycle which comprises reacting by addition and rearrangement in the presence of an acidic condensing agent a polycyclopentadiene having two double bonds and one to four endomethylene cycles per molecule with an alcohol at a temperature above about 0° C. and below about 125° C.

5. A method for preparing ethers of hydroxy-dihydronorpolycyclopentadiene having an ether group on one terminal cycle and an olefinic linkage in the opposite terminal cycle which comprises reacting by addition and rearrangement in the presence of a boron trifluoride catalyst a polycyclopentadiene having two double bonds and one to four endomethylene cycles per molecule with an alcohol at a temperature above about 0° C. and below about 125° C.

6. A method for preparing ethers of hydroxy-dihydronorpolycyclopentadiene having an ether group on one terminal cycle and an olefinic linkage in the opposite terminal cycle which comprises reacting by addition and rearrangement in the presence of sulfuric acid a polycyclopentadiene having two double bonds and one to four endomethylene cycles per molecule with an alcohol at a temperature above about 0° C. and below about 125° C.

7. A method for preparing ethers of hydroxy-dihydronordicyclopentadiene having a double bond in a terminal five-membered ring which comprises reacting by addition and rearrangement in the presence of an acidic condensing agent dicyclopentadiene and an organic compound which has at least one alcoholic hydroxyl group at a temperature above about 0° C. and below the cracking temperature of dicyclopentadiene.

8. A method for preparing ethers of hydroxy-dihydronortricyclopentadiene having a double bond in a terminal five-membered ring which comprises reacting by addition and rearrangement in the presence of an acidic condensing agent tricyclopentadiene having two double bonds and two endomethylene cycles per molecule and an organic compound which has at least one alcoholic hydroxyl group at a temperature above about 0° C. and below the cracking temperature of the tricyclopentadiene.

9. A method for preparing ethers of hydroxy-dihydronordicyclopentadiene having a double bond in a terminal five-membered ring which comprises reacting by addition and rearrangement in the presence of a boron trifluoride coordination complex of an oxygenated compound dicyclopentadiene and an alcohol at a temperature between about 0° C. and about 125° C.

10. A method for preparing ethers of hydroxy-dihydronordicyclopentadiene having a double bond in a terminal five-membered ring which comprises reacting by addition and rearrangement in the presence of boron trifluoride coordination complex of an oxygenated compound dicyclopentadiene and a primary aliphatic alcohol at a temperature between about 0° C. and about 125° C.

11. A method for preparing ethers of hydroxy-dihydronordicyclopentadiene having a double bond in a terminal five-membered ring which comprises reacting by addition and rearrangement in the presence of a boron trifluoride coornation complex of an oxygenated compound dicyclopentadiene and a secondary aliphatic alcohol at a temperature between about 0° C. and about 125° C.

12. A method for preparing ethers of hydroxydihydronortricyclopentadiene having a double bond in a terminal five-membered cycle which comprises reacting by addition and rearrangement in the presence of a boron trifluoride coornation complex of an oxygenated compound tricyclopentadiene having two double bonds and two endomethylene cycles per molecule and an aliphatic alcohol at a temperature above about 0° C. and below the cracking temperature of the tricyclopentadiene.

13. An acid-catalyzed, addition-rearrangement product of an organic compound having at least one alcoholic hydroxyl group and a polycyclopentadiene having two double bonds, and one to four endomethylene cycles per molecule, said product being a dihydronorpolycyclopentadienyl ether of said organic compound.

14. An acid-catalyzed, addition-rearrangement product of an aliphatic alcohol and a polycyclopentadiene having two double bonds and one to four endomethylene cycles per molecule, said product being a dihydronorpolycyclopentadienyl ether of said alcohol.

15. An acid-catalyzed, addition-rearrangement product of a primary aliphatic alcohol and dicyclopentadiene, said product being a dihydronordicyclopentadienyl ether of said alcohol.

16. An acid-catalyzed, addition-rearrangement product of an organic compound having a secondary alcoholic hydroxyl group and dicyclopentadiene, said product being a dihydronordicyclopentadienyl ether of said alcohol.

17. An acid-catalyzed, addition-rearrangement product of methyl alcohol and dicyclopentadiene, said product being methyl dihydronordicyclopentadienyl ether.

18. An acid-catalyzed, addition-rearrangement product of butyl alcohol and dicyclopentadiene, said product being butyl dihydronordicyclopentadienyl ether.

19. An acid-catalyzed, addition-rearrangement product of sec.-octyl alcohol and dicyclopentadiene, said product being sec.-octyl dihydronordicyclopentadienyl ether.

HERMAN A. BRUSON.